US008981698B2

(12) United States Patent
Fuhge

(10) Patent No.: US 8,981,698 B2
(45) Date of Patent: Mar. 17, 2015

(54) APPARATUS FOR OPENING AND/OR CLOSING A DOOR

(71) Applicant: Diehl AKO Stiftung & Co. KG, Wangen (DE)

(72) Inventor: Bruno Fuhge, Opfenbach (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 120 days.

(21) Appl. No.: 13/656,872

(22) Filed: Oct. 22, 2012

(65) Prior Publication Data

US 2013/0099715 A1 Apr. 25, 2013

(30) Foreign Application Priority Data

Oct. 21, 2011 (DE) ......................... 10 2011 116 600

(51) Int. Cl.

| | |
|---|---|
| ***H02P 1/00*** | (2006.01) |
| ***F24C 15/02*** | (2006.01) |
| ***D06F 39/14*** | (2006.01) |
| ***E05F 15/12*** | (2006.01) |
| ***E05F 15/20*** | (2006.01) |
| *F25D 23/02* | (2006.01) |

(52) U.S. Cl.

CPC ................ *F24C 15/02* (2013.01); *D06F 39/14* (2013.01); *E05F 15/12* (2013.01); *E05F 15/2023* (2013.01); *E05F 15/2092* (2013.01); *E05Y 2900/304* (2013.01); *F25D 23/028* (2013.01); *F25D 2600/02* (2013.01); *F25D 2700/02* (2013.01); *F25D 2700/04* (2013.01)

USPC ................................ 318/484; 318/34; 318/53

(58) Field of Classification Search

CPC ....... D06F 39/14; E05F 15/12; E05F 15/2092

USPC ...................................... 318/484, 445, 34, 53

See application file for complete search history.

(56) References Cited

U.S. PATENT DOCUMENTS

| | | | | |
|---|---|---|---|---|
| 4,340,799 | A * | 7/1982 | Ueda et al. | 219/723 |
| 5,548,969 | A * | 8/1996 | Lee | 62/228.4 |
| 6,225,904 | B1 | 5/2001 | Jaffe et al. | |
| 6,883,420 | B2 * | 4/2005 | Kuttalek | 99/334 |
| 7,069,924 | B2 * | 7/2006 | Kuttalek et al. | 126/273 R |
| 8,066,341 | B2 | 11/2011 | Brüstle | |
| 8,217,611 | B2 * | 7/2012 | Ennis | 318/445 |
| 8,347,553 | B2 * | 1/2013 | Hecht et al. | 49/358 |
| 8,653,767 | B2 * | 2/2014 | Kim | 318/282 |
| 2011/0023511 | A1 | 2/2011 | Lee et al. | |

FOREIGN PATENT DOCUMENTS

| | | | |
|---|---|---|---|
| AT | 502944 | A1 | 6/2007 |
| DE | 202007011769 | U1 | 2/2008 |
| JP | 2000111238 | A | 4/2000 |
| JP | 2000249349 | A | 9/2000 |
| WO | 0123816 | A1 | 4/2001 |
| WO | 2005079630 | A1 | 9/2005 |

* cited by examiner

*Primary Examiner* — David S Luo

(74) *Attorney, Agent, or Firm* — Laurence A. Greenberg; Werner H. Stemer; Ralph E. Locher

(57) ABSTRACT

An apparatus for opening and/or closing a door of a domestic appliance, such as, for example, an oven, a refrigerator and the like, has a drive apparatus for the automatic opening and/or closing of the door and an actuating device which is operable by a user for activating the drive apparatus in order to open or to close the door.

9 Claims, 3 Drawing Sheets

APPARATUS FOR OPENING AND/OR CLOSING A DOOR

CROSS-REFERENCE TO RELATED APPLICATION

This application claims the priority, under 35 U.S.C. §119, of German application DE 10 2011 116 600.2, filed Oct. 21, 2011; the prior application is herewith incorporated by reference in its entirety.

BACKGROUND OF THE INVENTION

1. Field of the Invention

The present invention relates to an apparatus for opening and/or closing a door, in particular a door of a domestic appliance such as, for example, an oven, a refrigerator, a freezer or the like.

In the case of conventional domestic appliances, for opening and closing, the door usually has to be gripped at a door handle and then opened or closed. To this end, the user must generally have at least one hand free. If the user, for example, wants to push a baking tray into a pre-heated oven, in the case of a traditional oven he first has to put down the baking tray, then open the oven door at the door handle using the hand that has now become free, then pick up the baking tray again and push it into the oven and finally close the oven door again. As an alternative to this, the user can also balance the baking tray with one hand and grip the door handle with the other hand in order to open the oven door. Both methods of operation are awkward for the user. In addition, in the case of this method of operation, the oven door can remain open for a relatively long time, which in this case results in a loss of heat in the interior of the oven and consequently to an increased energy consumption.

SUMMARY OF THE INVENTION

It is accordingly an object of the invention to provide an apparatus for opening and/or closing a door which overcomes the above-mentioned disadvantages of the prior art devices of this general type, which is an improved apparatus for opening and/or closing a door, and is simple for a user to operate.

The apparatus according to the invention for opening and/or closing a door has a drive apparatus for the automatic opening and/or closing of the door and an actuating device for activating the drive apparatus operable by a user in order to open or to close the door.

In the case of the apparatus configured in this manner, to open or close the door the user simply has to operate the actuating device which, as a result, activates the drive apparatus, which, in its turn, automatically opens or closes the door. To open/close the door, the user does not have to grip a door handle and consequently, in particular, does not require a free hand to open/close the door. This simplifies the opening or closing of the door for the user. In other words, a user can open or close the door in a simple manner even when his hands are full or fully loaded when using the apparatus according to the invention and in this way, can simply load or unload the respective (domestic) appliance even when his hands are full or fully loaded. Finally, the entire handling of the appliance in which the door is installed can be simplified for the user in this way.

The apparatus according to the invention is suitable for doors of domestic appliances, in particular electronic domestic appliances, such as ovens, refrigerators, upright freezers, deep freezers, microwave ovens, dishwashers, washing machines, laundry driers, combined washer-driers and the like.

The term 'a drive apparatus' is to refer in this context to any type of apparatus which is suitable to open or to close the respective door of the respective appliance independently, i.e. automatically. In a preferred manner, the drive apparatus is an electric or electro-mechanical drive apparatus. The drive apparatus can be realized, depending on the application, for automatically opening the door, for automatically closing the door or for automatically opening and automatically closing the door. The drive apparatus is preferably incorporated into a joining mechanism of the door (e.g. hinge, fitting, joint, etc.) or is coupled to such. The drive apparatus for the automatic opening/closing of the door is preferably provided with a free running state in order to be able to open or close the door where required manually, i.e. without operating the actuating device, but for example using the door handle.

The term 'an actuating device' is to refer in this context to any type of device which can be operated by a user and is connected indirectly or directly to the drive apparatus of the door in order to activate the door where required. In a preferred manner, the actuating device includes components for detecting the user's wishes to open/close the door, to evaluate the detection result, to control the drive apparatus or communicate with the drive apparatus and the like.

The actuating device is to be operable by a user. This is to refer in this context to any type of operating, in particular however types of operating which do not necessarily require the user to have a free hand.

In a preferred embodiment of the invention, the actuating device has at least one sensor for detecting a user.

In this context, the at least one sensor includes one sensor, two and more sensors and sensor arrangements of several sensors. The at least one sensor preferably forms a two-dimensional or field-like sensor arrangement or sensor face.

The at least one sensor is realized in order to detect a user. In particular, the at least one sensor is to be capable of recognizing the user's desire to open or close the door. The at least one sensor is preferably realized in order to detect a presence, a movement, a contact, a noise, a gesture, etc. of a user in the vicinity or at the door or the respective appliance. The at least one sensor is preferably selected from touch-sensitive sensors, proximity-sensitive sensors, movement-sensitive sensors, angle-recognition sensors, pressure-sensitive sensors, acoustic sensors (with and without speech recognition), optical sensors, electronic sensors (e.g. capacitive, inductive, etc.) and combinations of the types of sensors.

The sensor is preferably arranged on the door, a door frame or a housing, for example of the domestic appliance. The door as a mounting location for the sensor, in this case, also includes in particular the door panel and also the door handle. In the case of several sensors, they can be positioned at identical or at different positions on the door, the door frame or the housing. The sensor can equally be built in the hinge as an angle sensor. In addition, the sensor can be realized on a three-dimensional surface.

In a preferred development of the invention, the apparatus also has a detecting device for detecting an open/closed state of the door. In this way, for example, the drive apparatus can be activated in a targeted manner as a closed door only has to be opened and an open door only has to be closed. The actuating device can also be deactivated at times, where applicable, in this manner when, for example, only an automatic opening of the door by the actuating device is provided. In this context, the detecting device includes detecting apparatuses which are incorporated in the drive apparatus for the automatic opening/closing or are connected to the same; components which are separate from the drive apparatus, the detecting signals of which are transmitted directly or indirectly to the drive apparatus; components which are separate from the drive apparatus, the detecting signals of which are transmitted to the actuating device or a component part of the actuating device (e.g. control apparatus); and the like.

In a further preferred development of the invention, the actuating device includes a timer which detects a period of an operation of the actuating device by a user. By use of such a timer, for example, the difference can be made between a wanted and an unintentional operation of the actuating device in order to avoid an unwanted opening/closing of the door. For example, the actuating device only recognizes a wish of the user to open a door if the user touches a sensor face for a sufficiently long amount of time.

In a further preferred development of the invention, the apparatus also has a timer which detects a period of an open state of the door and the drive apparatus is activated after expiry of a predetermined period in order to close the open door. In this way it can be achieved that an open door is closed again automatically after a predetermined period without the user having to be active for this purpose. In this way, for example, an oven or refrigerator door can be prevented from remaining open for too long and using energy unnecessarily.

In yet another preferred development of the invention, the apparatus also has a safety device which releases or blocks the drive apparatus or the activation thereof (by the actuation device) in dependence on an operating state of the domestic appliance. In this way, for example, the door can be prevented from being opened in an operating state for which an opening of the door would be particularly unfavorable. In a preferred manner, the safety device is incorporated in the drive apparatus or in the actuating device. An automatic door lock is provided in a preferred manner along with the safety device.

In yet another preferred development of the invention, the apparatus additionally has a display device which displays a deadlock state of the drive apparatus. The deadlock state is, for example, a deadlock caused by the abovementioned safety device or an error function of the drive apparatus. In a preferred manner, the display apparatus is arranged on the door, the door frame or the housing of the respective appliance. In a preferred manner, the display device is positioned in the vicinity of or together with further operating displays of the respective appliance or in the vicinity of a sensor/sensor field of the actuating device. The display apparatus includes in particular optical and acoustic display apparatuses as well as combinations thereof.

Other features which are considered as characteristic for the invention are set forth in the appended claims.

Although the invention is illustrated and described herein as embodied in an apparatus for opening and/or closing a door, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
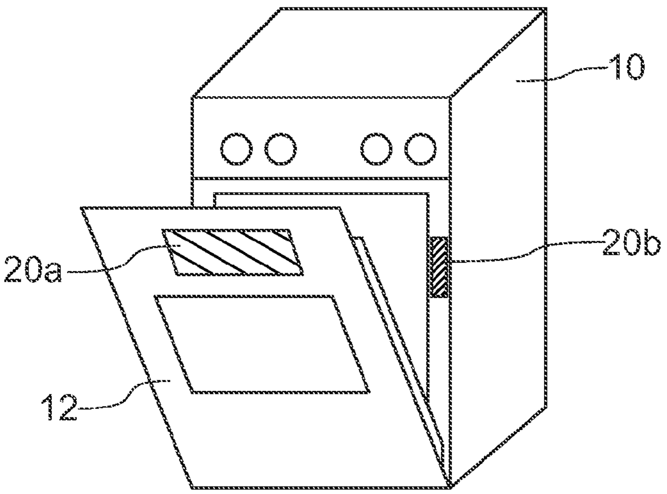
FIG. 1 is a simplified perspective view of an oven according to a preferred exemplary embodiment of the present invention.
Figure 2:
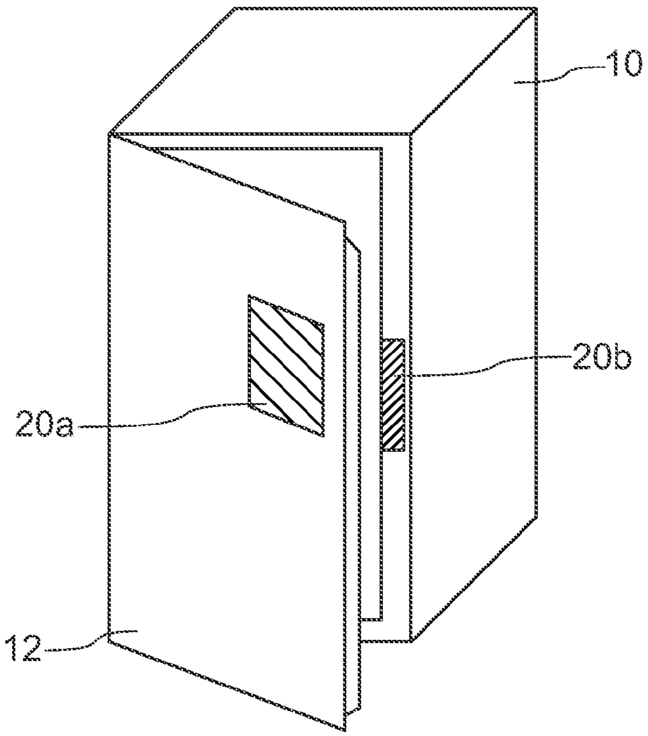
FIG. 2 is a simplified perspective view of a refrigerator according to a preferred exemplary embodiment of the present invention.
Figure 4:
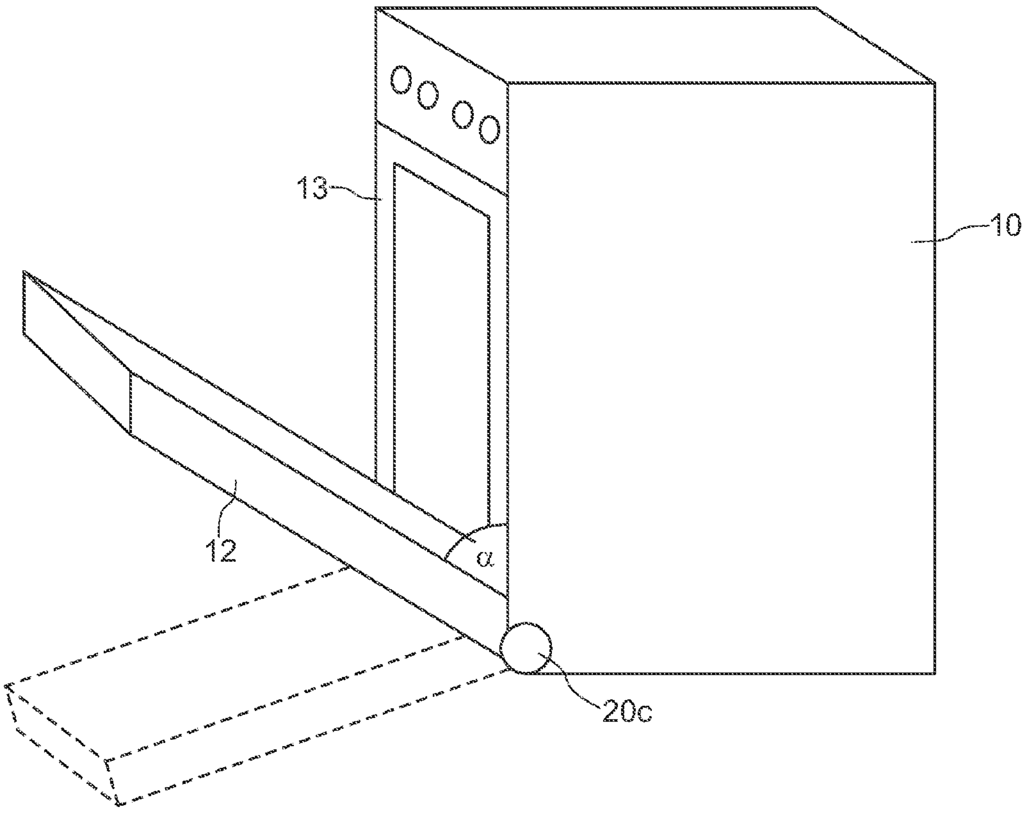
FIG. 4 is a simplified perspective view of an oven according to a preferred exemplary embodiment of the present invention.

FIGS. 1, 2 and 4 show an oven or a refrigerator (as an example of an electronic domestic appliance) as application examples of the present invention.

Referring now to the figures of the drawing in detail and first, particularly, to FIG. 1 thereof, there is shown a housing 10 of an oven or refrigerator which defines an interior which is accessible in a known manner via a front-side access opening, i.e. facing the user. An access opening is closable in each case by a door 12.

Figure 3:
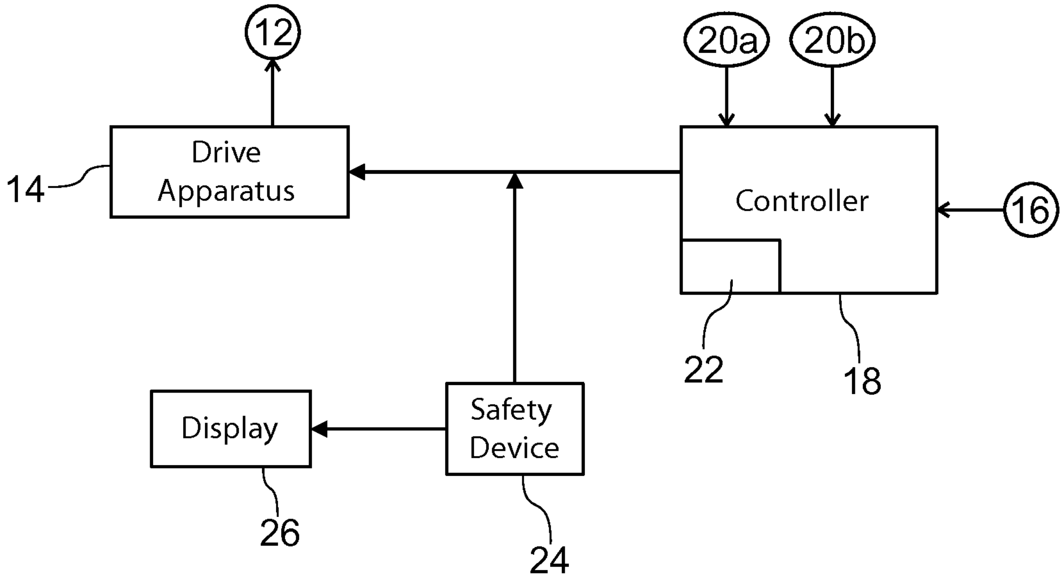
FIG. 3 is a simplified block diagram of an apparatus according to the invention for opening/closing a door.

As shown in FIG. 3, the door 12 is provided with or connected to a drive apparatus 14, by which the door 12 can be independently, i.e. automatically opened and closed. For example, the door 12 has a hinge with an integrated drive. The door 12 and/or the drive apparatus 14 are additionally provided with a detecting device 16 which detects the open/closed state of the door 12.

The oven or refrigerator also has an actuating device in order to be able to bring about an automatic opening/closing of the door 12 by a user. The actuating device has a control apparatus 18, a first sensor field 20*a* on the door 12, a second sensor field 20*b* on the door frame or housing 10 and a timer 22. The timer 22 is preferably incorporated into the control apparatus 18.

The sensor fields 20*a*, 20*b* are realized, for example, as touch-sensitive or proximity-sensitive sensor fields. They recognize a touch or proximity of a body part of the user or another object. The sensor 20*c* evaluates an angle of the door 12. The control apparatus 18 evaluates the detecting signals of the sensor fields 20*a*, 20*b*, 20*c* and activates the drive apparatus 14 in dependence on the evaluation result in order to open or close the door 12.

The sensor fields 20*a*, 20*b* can be realized, for example, as gesture sensors. The speed at which the drive apparatus 14 opens or closes the doors 12 is modifiable by a variation in the gesture or by different gestures of the user on or in front of the sensor face.

In a further development, the drive apparatus 14 is lockable or unlockable by way of a fixed gesture or by way of a gesture learnt beforehand.

By use of the timer/time function element 22, the control apparatus 18, in this case, can differentiate between an intentional operation and an unwanted operation of the sensor fields 20*a*, 20*b*. In this way, the control apparatus 18 only recognizes, for example, with a sufficiently long touch on a sensor field 20*a*, 20*b* by the user that the user really would like to have to the door 12 opened/closed.

In the exemplary embodiments of FIGS. 1 and 2, in each case the sensor field 20*a* is mounted on the door 12 and the sensor field 20*b* on the door frame of the respective domestic appliance. Instead of this, it is also possible to provide in each case only one of the two sensor fields 20*a*, 20*b* or to provide other/further sensor fields at other positions on the domestic appliance.

The sensor fields 20*a*, 20*b* preferably have touch-sensitive or proximity-sensitive sensors or sensor arrangements. These are based, for example, on capacitive or optical sensor structures. However, in addition to this or as an alternative, movement-sensitive or pressure-sensitive sensors/sensor arrangements can also be used. It is also conceivable for an acoustic sensor to be used (with or without speech recognition). The decisive criterion for the respective selection of the sensor 20*a*, 20*b* is only simple operability by the user, in particular without a free hand (as the user would need to grip the door handle).

In the exemplary embodiment shown in FIG. 4, the sensor 20*c* is mounted in the hinge between the domestic appliance 10 and the door 12. The sensor recognizes the angle $\alpha$ between the door 12 and the domestic appliance 10. With the door 12 closed, the angle $\alpha$ is 0°. With the door 12 completely open, the angle $\alpha$=90°.

Initial state closed doors 12 (angle $\alpha$=0°): In order to open the doors 12, an arbitrary point on the closed doors 12 is pressed. As a result, a door seal 13 is deformed and an offset angle is generated. The angle $\alpha$ is less than 0°, which the sensor 20*c* recognizes and as a result gives a signal to the control apparatus 18.

Initial state open doors 12 (angle $\alpha$=90°): To close the doors 12, an arbitrary point on the open doors 12 is pressed. As a result, the hinge yields, an offset angle is generated. The sensor 20*c* detects a change in the angle, that is to say an angle $\alpha$ greater than or less than 90°, and as a result gives a signal to the control apparatus 18.

The control apparatus 18 activates the drive apparatus 14 of the door 12 depending on the detecting signal of the sensors 20*a*, 20*b*, 20*c* and depending on the open/closed state of the door 12 detected by the detecting device 16. In this way, the control apparatus 18 activates, for example, the drive apparatus 14 to close the door 12 when by use of the sensors 20*a*, 20*b*, 20*c* it recognizes an operation of the actuating device by the user and by way of the detecting device 16 recognizes an open state of the door 12.

It is also possible to dispense with the detecting device 16 for detecting the open/closed state of the door 12. In this case, the drive apparatus 14, with an activation by the control apparatus 18, automatically selects the movement of the door into the respectively other open/closed state.

By use of the detecting device 16 for detecting the open/closed state of the door 12, depending on the application it is also possible to restrict the functionality of the automatic door system or of the drive apparatus 14. In this way, it can be provided, for example, that the actuating device is only to serve for opening the door 12, the closing of the door 12, however, can be effected in an exclusively manual manner. In this case, the drive apparatus 14 and/or the control apparatus 18 are deactivated, for example, in case the detecting device 16 recognizes that the door 12 is open.

The timer/the time function element 22 of the control apparatus 18 can additionally be utilized for the purpose of bringing about an automatic closing of the door 12 by the drive apparatus 14 after a predetermined period. This means that the door 12 can be prevented from standing open too long and the heat/cold being able to escape from the oven or the refrigerator.

In addition to this or as an alternative, in the case of an open door 12 after a predetermined period which is monitored by the timer/the time function element 22, an acoustic and/or an optical warning signal can be output to the user in order to remind him/her of the open door 12.

As shown in FIG. 3, an additional option is to provide a safety device 24 which selectively releases or blocks the drive apparatus 14 or the activation thereof via the control apparatus 18. The safety device 24 carries out the release/deadlock of the drive apparatus 14 for example in dependence on an operating state of the respective domestic appliance. In this way, for example, operating states of a domestic appliance are conceivable in which an opening of the door 12 is to be prevented. Along with an automatic door lock, present where applicable, such a safety device 24 provides a further effective measure to protect the domestic appliance and the user.

The safety device 24 is connected to a display apparatus 26 which displays to the user, when the actuating device or one of its sensor fields 20*a*, 20*b*, 20*c* are operated, a deadlock or even an error function of the drive apparatus 14 for the door 12. The display apparatus 26 is arranged, for example, in the vicinity of one of the sensor fields 20*a*, 20*b* or in an operating panel of the oven or refrigerator. The display apparatus 26 can, for example be realized as a simple LED or can be realized to output a signal tone.

The advantages of the above-described domestic appliances are to be clarified by the two following application examples.

If, for example, a user wants to bake a cake, the oven first of all has to be preheated to a desired temperature. During the preheating process, the oven door is closed. Once the oven is preheated to the desired temperature, the prepared cake tin or the prepared baking tray can be moved into the oven. To this end, the user can pick up the baking tray directly with both hands and go to the oven. Without having to put the baking tray down, the user, for example, can touch the sensor field in the door with his elbow or with the baking tray or can press lightly against it. The drive apparatus then automatically opens the door and the baking tray can be pushed in. The closing of the oven door is then either effected manually using the hands which are then free again or once again automatically by touching the sensor field.

In another case, a user wants to remove a product from the refrigerator. In order to close a conventional refrigerator again, the product, tediously, has first to be put down. In the case of a refrigerator with the automatic door system according to the invention, the user simply has to push with his elbow or with the removed product lightly against a sensor field on the refrigerator or just touch it in order, by means of the actuating device, to activate the door drive which then automatically closes the refrigerator.

The invention claimed is:

1. An apparatus for opening and/or closing a door of an oven, the apparatus comprising:

a drive apparatus for an automatic opening and/or closing of the door;

an actuating device for activating said drive apparatus operable by a user for opening or closing the door;

a sensor for determining an angle of the door, said actuating device activating said drive apparatus in dependence on the angle of the door; and a further sensor for recognizing a gesture of the user for opening and closing the door and for controlling a speed of door during the opening and the closing of the door.

2. The apparatus according to claim 1, wherein said actuating device has at least one sensor for detecting a speech command of the user for opening or closing the door.

3. The apparatus according to claim 2, wherein said sensor is disposed on the door, a door frame or a housing of the domestic appliance.

4. The apparatus according to claim 1, further comprising a detecting device for detecting an open/closed state of the door.

5. The apparatus according to claim 1, wherein said actuating device includes a timer for detecting a period of an operation of said actuating device by the user.

6. The apparatus according to claim 1, further comprising a timer for detecting a period of an open state of the door, and said drive apparatus is activated after expiry of a predetermined period in order to close the opened door.

7. The apparatus according to claim 1, further comprising a safety device for releasing or blocking said drive apparatus or an activation of said drive apparatus in dependence on an operating state of the domestic appliance.

8. The apparatus according to claim 1, further comprising a display device for displaying a deadlock state of said drive apparatus.

9. An oven, comprising:

an oven housing;

a door supported by said housing;

a drive apparatus for an automatic opening and/or closing of said door;

an actuating device for activating said drive apparatus operable by a user for opening or closing said door;

a sensor for determining an angle of said door, said actuating device activating said drive apparatus in dependence on the angle of the door; and a further sensor for recognizing a gesture of the user for opening and closing the door and for controlling a speed of door during the opening and the closing of the door.

* * * * *